(12) United States Patent
Filatov et al.

(10) Patent No.: US 6,950,555 B2
(45) Date of Patent: Sep. 27, 2005

(54) HOLISTIC-ANALYTICAL RECOGNITION OF HANDWRITTEN TEXT

(75) Inventors: Alexander Filatov, Longmont, CO (US); Igor Kil, Boulder, CO (US); Arseni Seregin, Longmont, CO (US)

(73) Assignee: Parascript LLC, Niwot, CO (US)

( * ) Notice: Subject to any disclaimer, the term of this patent is extended or adjusted under 35 U.S.C. 154(b) by 583 days.

(21) Appl. No.: 09/788,032

(22) Filed: Feb. 16, 2001

(65) Prior Publication Data

US 2002/0114523 A1 Aug. 22, 2002

(51) Int. Cl.[7] .............................. G06K 9/72; H04N 1/40
(52) U.S. Cl. ...................................... 382/229; 358/462
(58) Field of Search ................................. 382/101, 102, 382/113, 173–180, 185, 224–231, 159, 160, 165, 170, 171, 172; 358/462

(56) References Cited

U.S. PATENT DOCUMENTS

| | | | | |
|---|---|---|---|---|
| 5,144,683 A | * | 9/1992 | Suzuki et al. | 382/203 |
| 5,287,275 A | * | 2/1994 | Kimura | 707/5 |
| 5,313,527 A | | 5/1994 | Guberman et al. | |
| 5,455,872 A | * | 10/1995 | Bradley | 382/228 |
| 5,832,108 A | * | 11/1998 | Fukita et al. | 382/159 |
| 5,987,170 A | * | 11/1999 | Yamamoto et al. | 382/170 |
| 6,041,141 A | * | 3/2000 | Yamamoto et al. | 382/231 |

OTHER PUBLICATIONS

Chin et al. "Empirical design of a holistic verifier for automatic sorting of handwritten Singapore Postal Addresses", Document Analysis and Recognition, 1999, pp. 733–736.*

Casey et al. "A survey of methods and strategies in character segmentation", Pattern Analysis and Machine Intelligence, IEEE, 1996, pp. 690–706.*

Sherkat et al. "Whole word recognition in facsimile images", Document Analysis and Recognition, 1999, pp. 547–550.*

Madhvanath et al. "The role of holistic paradigms in handwritten word recognition", Pattern Analysis and Machine Intelligence, 2001, pp. 149–164.*

(Continued)

*Primary Examiner*—Samir Ahmed
*Assistant Examiner*—Brian Le
(74) *Attorney, Agent, or Firm*—Merchant & Gould P.C.

(57) ABSTRACT

In a combined holistic and analytic recognition system, the holistic recognition module will recognize an input word or phrase image by matching an input string of character features for the whole word or phrase against a string of prototype features for a plurality of reference words in a lexicon. This will yield a holistic answer list of recognized word or phrase candidates for the input word or phrase along with a confidence value for each answer on the list. At the same time based on each answer in the answer list, the holistic recognition modules will generate a list of character features and segment the character features into sets for each character in an answer. The analytical recognition module uses segmentation hypotheses from the segmented character feature sets to cut the image of the input string of characters into individual character images. A plurality of character images for the various segmentation hypotheses will be recognized to produce an analytical answer list having a plurality of word or phrase answers for the input word or phrase. Each analytic word answer will have a confidence value based on the combined confidence of recognizing each character. The holistic answer list and the analytic answer list will be examined to find the best answer from the two lists as the recognition of the input handwritten text.

13 Claims, 8 Drawing Sheets

OTHER PUBLICATIONS

An Algorithm Toolbox for On–Line Cursive Script Recognition, Robert K. Powalka, Doctoral Thesis, 'Online!'; Oct. 1995, pp. 1–286, Nottingham, UK; http://citeseer.nj.nec.com/rd/70348799%2C209471%2C1%2C0.25%2CDownload/http://citeseer.nj.nec.com/compress/0/papers/cs/8855/http:zSzzSzwww.doc.ntu.ac.ukzSz{inkdataSzrkpzSzthesis.main.ps.gz/an–algorithm–toolbox–for.ps.

A Multi–Classifier Combination Strategy for the Recognition of Handwritten Cursive Words, B. Plessis, et al.; Document Analysis and Recognition, 1993., Proceedings of the Second International Conference on Tsukuba Science City, Japan, Oct. 20–22, 1993, Los Alamitos, CA, USA, IEEE Comput. Soc.; Oct. 20, 1993, pp. 642–645.

Serial Classifier Combination for Handwritten Word Recognition; S. Madhvanath, et al.; Document Analysis and Recognition, 1995., Proceedings of the Third International Conference on Montreal, QUE., Canada Aug. 14–16, 1995, Los Alamitos, CA, USA, IEEE Comput. Soc., US; Aug. 14, 1995, pp. 911–914.

Methods of Combining Multiple Classifiers and Their Applications to Handwriting Recognition, L. Xu, et al., IEEE Transactions on Systems, Man and Cybernetics, IEEE Inc., New York, US, vol. 22, No. 3, May 1992, pp. 418–435, section III.A. Average Bayes Classifier.

Handwritten Word Recognition—The Approach Proved by Practice, Gregory Dzuba, Alexander Filatov, Dmitry Gershuny, Igor Kil; Parascript, LLC; www.parascript.com.

A Novel Learning Method by Structural Reduction of Dags for On–Line OCR Applications, I–Jong Lin and S.Y. Kung; Dept. of Electrical Engineering, Princeton University, Princeton, NJ.

Coding and Comparison of DAGs as a Novel Neural Structure with Applications to On–Line Handwriting Recognition; I–Jong Lin and S.Y. Kung, Princeton University, Princeton, NJ; www.ee–princeton.edu/~ijonglin/spaces//spaces.html.

Check Amount Recognition Based on the Cross Validation of Courtesy and Legal Amount Fields; Gregory Dzuba, Alexander Filatov, Dmitry Gershuny, Igor Kil, Vadim Nikitin; Parascript, LLC.

* cited by examiner

HOLISTIC-ANALYTICAL RECOGNITION OF HANDWRITTEN TEXT

TECHNICAL FIELD

This invention relates to recognizing handwritten text images in a computing system to provide text input information to the computing system. More particularly the invention relates to using both holistic and analytical recognition operations working together to perform a more reliable recognition of the text images.

BACKGROUND OF THE INVENTION

The field of handwritten text recognition is of interest due to numerous commercial applications in offline recognition systems such as mail sorting, bank check reading and forms reading, and in online recognition systems such as touch screen input with a stylus to all types of computing systems but particularly laptop, tablet or handheld computing systems.

The main difficulties of hand written or cursive text recognition are well known—characters in the words are most often connected, and the variability of character shapes is high. There are two main strategies in the field of handwriting recognition. They are holistic recognition and analytical recognition. In holistic recognition a string of characters, such as a word or a phrase, is recognized as a whole without an individual character recognition stage in the recognition process. In analytical recognition a string of characters are first segmented into characters and then recognized character by character to recognize the word or phrase.

The main advantage of holistic recognition is that it avoids the segmentation stage and accordingly avoids segmentation mistakes. Holistic recognition of a word, for example, begins with a representation of the word created by extracting features of the cursive writing such as strokes used in the formation of portions of a character. These extracted features in the word representation are then compared against feature representations for words from a lexicon of all words in a reference vocabulary. The main disadvantage of a holistic approach is its inability to take into account a detailed character shape. This leads to significant degradation of recognition results for large size lexicons.

The main advantage of analytical recognition is the availability of well-known and highly developed character recognition techniques. However, there is a segmentation stage in the recognition process, and the problem is that erroneous segmentation decisions will lead to incorrect recognition of characters and thus the word. The segmentation algorithm can generate many incorrect variants for characters based on the portion of the character image where the segmentation decision is made. Thus, the main disadvantage of this approach is that accurate recognition depends on correct segmentation, and correct segmentation is difficult because of the variation in cursive writing styles.

It is with respect to these considerations and others that the present invention has been made.

SUMMARY OF THE INVENTION

In accordance with the present invention, the above and other problems are solved by providing a combined holistic and analytic recognition system. The holistic recognition module will recognize an input string of characters by matching a string of features for the whole string of characters against a string of features for a plurality of reference character strings in a lexicon of reference character strings. This will yield a holistic answer list of recognized word or phrase candidates for the input string of characters along with a confidence value for each answer on the list. At the same time based on each answer in the answer list, the holistic recognition modules will generate a list of character features and segment the character features into sets for each character in an answer. Accordingly, although the holistic recognition module does not use segmentation to make its recognition decisions, these recognition answers in retrospect are used to define various segmentation hypotheses for sets of character features per character in the input string of characters.

The analytical recognition module uses the segmentation hypotheses to cut the image of the input string of characters into individual character images. A plurality of character images for the various segmentation hypotheses will be recognized to produce an analytic answer list having a plurality of answer strings of characters for the input string of characters. Each answer string will have a confidence value based on the combined confidence in recognizing each character. The holistic answer list and the analytic answer list will be examined to find the best answer from the two lists as the recognition of the input handwritten text.

The invention may be implemented as a computer process, a computing system or as an article of manufacture such as a computer program product or computer readable media. The computer program product or computer readable media may be a computer storage medium readable by a computer system and encoding a computer program of instructions for executing a computer process. The computer program product or computer readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF PREFERRED EMBODIMENTS

The logical operations of the various embodiments of the present invention are implemented (1) as a sequence of computer implemented steps running on a computing system and/or (2) as interconnected machine logic modules within the computing system. The implementation is a matter of choice dependent on the performance requirements of the computing system implementing the invention. Accordingly, the logical operations making up the embodiments of the present invention described herein are referred to variously as operations, steps or modules. It will be recognized by one skilled in the art that these operations, steps and modules may be implemented in software, in firmware, in special purpose digital logic, and any combination thereof without deviating from the spirit and scope of the present invention as recited within the claims attached hereto.

Figure 1:
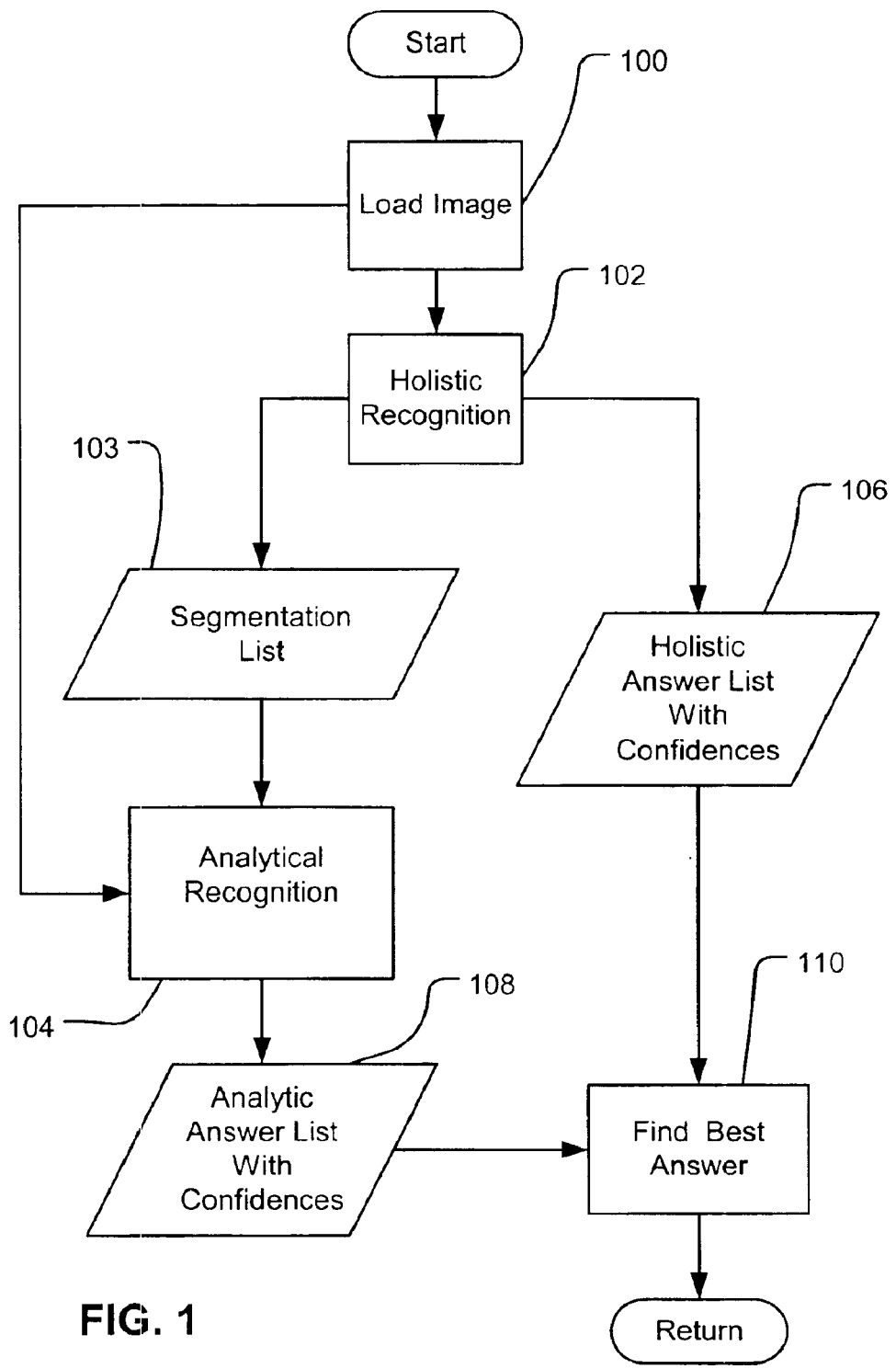
FIG. 1 shows one embodiment of the invention where the holistic recognition module passes segmentation information to the analytical recognition module.

In one embodiment of the invention depicted in FIG. 1, a load image module 100 provides a digitized representation of an input string of characters to be recognized. The string of characters is most typically a word, but might be a plurality of words making up a phrase. The string of characters are alphanumeric characters, and thus might be mixed as numbers and words in a phrase. While "word" will be used throughout to represent the character string being recognized, it should be understood that the character string might be a mix of alphanumeric characters, a plurality of words, or a phrase.

The digitized image of the word is passed to holistic recognition module 102 and to the analytical recognition module 104. The holistic recognition module 102 operates on the entire word to recognize the word as a whole. This is done by breaking the word into character features and making a decision on recognition of the whole word based on the string of character features. A character feature, depending on the holistic recognition technique used, may be different information elements of a character. One example of a holistic recognition technique is described in U.S. Pat. No. 5,313,527, entitled METHOD AND APPARATUS FOR RECOGNIZING CURSIVE WRITING FROM A SEQUENTIAL INPUT INFORMATION, invented by S. A. Guberman, Ilia Lossev, and Alexander V. Pashintsev. In this particular patent, the character features are referred to as metastrokes, i.e. a stroke forming a portion of a character.

Holistic recognition module 102 also provides a segmentation list 103 indicating the segmentation point between the end of one character or letter and the beginning of the next character or letter. The segmentation is not part of the holistic recognition operation, however, the answer produced by the holistic recognition operation may be used to define segmentation points between characters. Each answer will have sets of character features that make up each character in the answer arrived at by the holistic recognition module 102. For example, in the Guberman, et al. patent, the characters in an answer may be associated with a string of metastrokes. Thus, the answer produced by the holistic recognition module 102 also contains a set of metastrokes for each character in the holistic answer. Thus, the holistic recognition module 102 produces, as a byproduct, a segmentation list 103 which may be used by the analytical recognition module 104 to segment the digital image.

Analytical recognition module 104 uses the segmentation list for the answers in the holistic answer list 106 to cut the digital image into character images. These character images may then be recognized by a character image recognition operation sometimes referred to as a character classifier. As each character in a word is recognized by the analytical recognition module 104 an analytic answer for the word will be built up and a confidence in the answer will be assigned to the answer word. These analytic answer words for various segmentations of the digital image of the word will be collected in the analytic answer list 108. Best answer module 110 then takes the analytical word answer list 108 and the holistic word answer list 106 and finds the best, or most confident, answer in the list. There are multiple techniques for finding the best answer, and two such techniques will be described hereinafter with reference to FIGS. 5 and 6.

Figure 2:
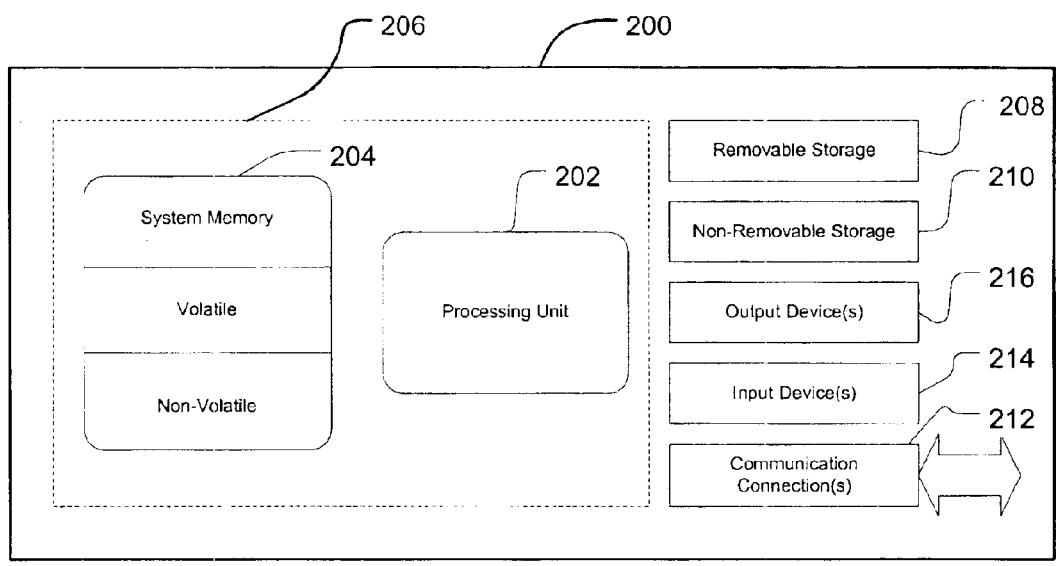
FIG. 2 illustrates an computing environment in which the various embodiments of the invention may operate.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or palm-sized devices, tablet devices, laptop devices, multiprocessor systems, microprocessor-based systems, set top boxes, programmable consumer electronics, network PCs, minicomputers, mainframe computers, distributed computing environments that include any of the above systems or devices, and the like.

In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210.

Memory 204, removable storage 208 and non-removable storage 210 are all examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media or computer program product as used herein includes both storage media and communication media.

Device 200 may also have input device(s) 214 such as keyboard, mouse, pen, voice input device, touch screen input device, document scanners etc. Output device(s) 216 such as a display, speakers, printer, electro-mechanical devices, such as document handlers, controlled by device 200, may also be included. All these devices are well know in the art and need not be discussed at length here. The particular input/output device working with the computing device 200 will depend on the application in which the recognition system is working and whether the recognition system is working offline or online with cursive images being recognized.

Figure 3:
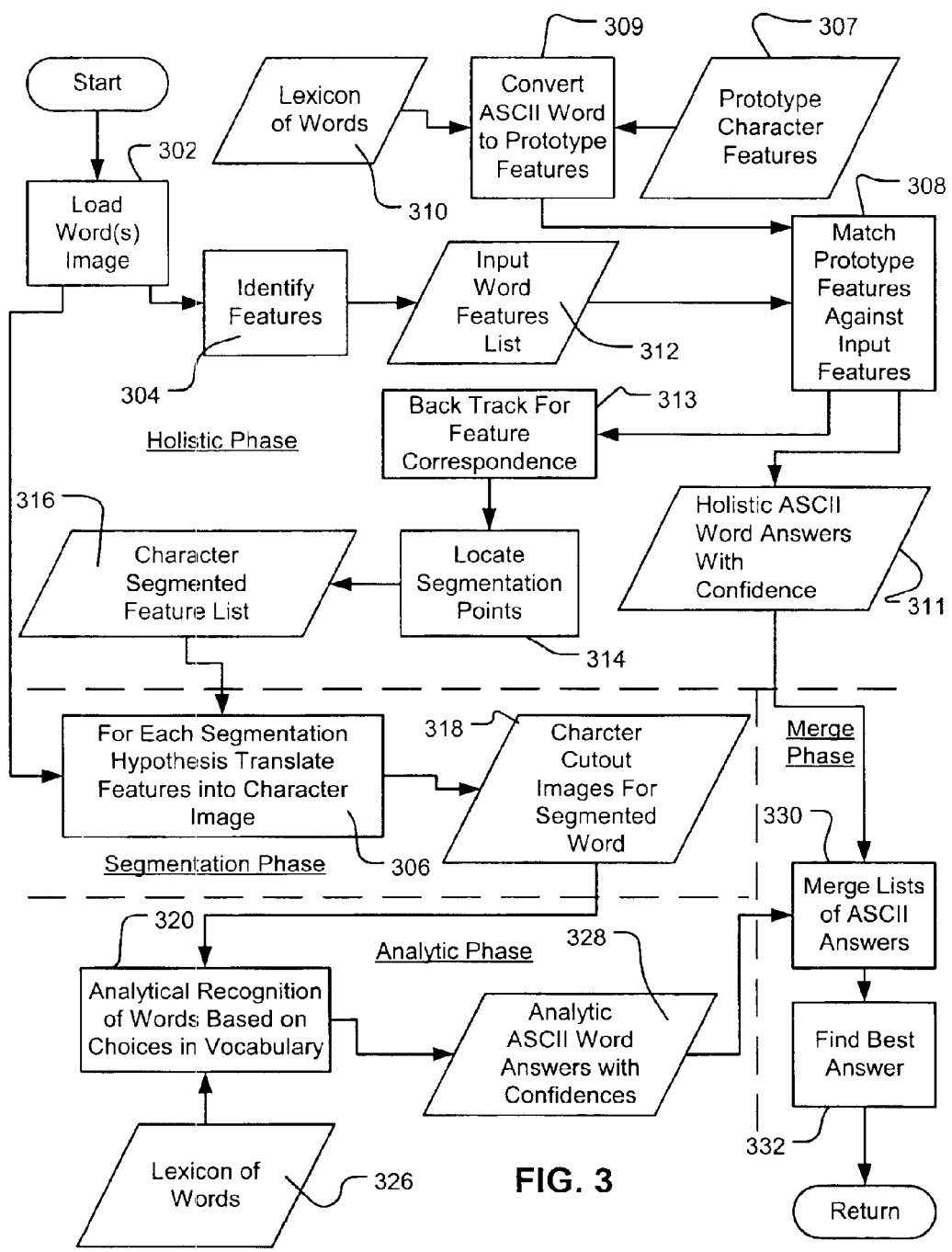
FIG. 3 shows another embodiment of the invention illustrating the operational flow for a holistic recognition phase, a segmentation hypothesis phase, analytical recognition phase, and the merge phase to find the best answer.

With the computing environment in mind, another embodiment of the invention is shown in FIG. 3. In this embodiment, the combined holistic-analytic recognition technique is divided into a holistic phase, a segmentation phase, an analytic phase and a merge phase. Again, an image of a word is loaded into the computing system by the load operation 302. The image might be loaded by scanning a handwritten document or by detecting a word entered on a touch screen with a stylus. The load operation 302 digitizes the cursive word image and passes it to the identify features module 304 and to the translate module 306. The identify features module 304 breaks the word image into character features, i.e. portions of a character that may be used to recognize the word. Accordingly, the output of the identify features module 304 is a string of character features for the entire word, or in the case of the Guberman et al patent, a string of metastrokes. Another output from the identify features module 304 is the position of each feature relative to the word image. In the example of metastrokes, the features list 312 would contain, for the input word image, the string of metastrokes for the input word and the position of the metastrokes along the digitized image of the word.

In the matching operation 308 the string of input character features from feature list 312 is matched against prototype features for words in a vocabulary provided by a lexicon of words 310. Lexicon, or dictionary, 310 may be tailored to an expected vocabulary for the input words to be recognized. The words in the lexicon are stored in ASCII character form. The words in ASCII character form from lexicon 310 are converted by convert operation 309 into a string of prototype character features. A plurality of sets of prototype character features for various shapes of each ASCII character is stored as prototype character features 307. Convert operation 309 retrieves one or more prototype character feature sets for each character in a word from lexicon 310 and passes the string of prototype character features for the reference word to the matching operation 308. If the character features are metastrokes, a prototype string of metastrokes is then compared against the input string of metastrokes received from identify operation 304 for the input word.

The matching technique is described in detail in the Guberman, et al., U.S. Pat. No. 5,313,527. The result of the matching operation 308 is a list of holistic ASCII word answers for all the possible matches between the input word to be recognized and the various possible word variations in the vocabulary stored in lexicon 310. Each of these word answers will have with it a confidence value, which is a measure of the similarity between the metastrokes representing the input word and the metastrokes making up the reference word from the vocabulary.

After the matching operation for each answer, it is possible to construct a character segmented feature list. The constructing operation includes a back track operation 313 and a locate operation 314. The back track operation 313 traces back through the decision operations performed by matching operation 308 in matching the strings of metastrokes. As the decisions are traced, back track operation 313 associates each input metastroke with a corresponding prototype metastroke. The decision operations may be graphed as a matching path through a matching graph matrix where as in the Guberman et. al patent, the matching graph ordinates are the prototype metastrokes and the input metastrokes. This matching technique and the matching graph is also described in an article entitled "Handwritten Word Recognition—The Approach Proved by Practice" by G. Dzuba, A. Filatov, D. Gershuny, and I. Kil, (Proceedings IWFHR-VI, Aug. 12–14, 1998, Taejon, Korea, pp. 99–111. A matching decision, which moves the recognition process forward in the matching graph, is a move diagonally through the graph. Each of these diagonal moves effectively identifies a correspondence between an input metastroke and a prototype metastroke.

Locate operation 314 then locates the character segmentation points between input metastrokes from the correspondence of the input and prototype metastrokes. Since the character segmentation locations between metastrokes are known for the string of prototype metastrokes, this information is applied to the correspondence between the input and prototype metastrokes to detect the segmentation points in the string of input metastrokes. Thus, the output of the locate operation 314 is the character segmented feature list 316 which has a string of character features for each answer in the holistic answer list 311, and features are segmented into character sets for each character in the answer.

In the segmentation phase, the character segmented feature list 316 is used to provide various segmentation hypotheses for the word image being recognized. Translate module 306 receives the character segmented feature list 316 and the digitized word image. In effect, the translate module 306 receives a segmentation hypothesis for the word image based on the segmentation location points in the character segmented feature list 316. For each segmentation hypothesis received from segmented feature list 316, translate module 306 cuts or segments the digitized image at this hypothetical segmentation point between characters in the digital image to create character cutout images for the character segmented word 318. These character cutout word images are then passed on to the analytical recognizer 320 in the analytic phase. One embodiment of the translate module 306 is described hereinafter with reference to FIG. 4.

In the analytic phase, each character image cut from the word image is recognized by the analytical recognition operation 320. Based on the various segmentation hypotheses, various ASCII characters are recognized in operation 320 as corresponding to the characters in the word image. Analytical recognition operation 320 will produce an analytic ASCII word answer with a confidence value for the answer. The confidence value will represent the combined confidence in the recognition of all characters in the answer. These analytic ASCII word answers 328 are then available for the merge or best answer phase. Exemplary embodiments of the analytical recognition operation 320 are described hereinafter with reference to FIGS. 7 and 8.

The merge phase produces the final best answer result from choices in the analytic ASCII word answer list 328 and the holistic ASCII word answer list 311. Merge operation 330 combines the ASCII answers from both the holistic answer list 311 and the analytic answer list 328. From this combination of information, find operation 332 detects the best word answer as a match for the input word image. After the best answer is determined, the operation flow returns to the main program. The merge or best answer phase is described in more detail in two different embodiments hereinafter shown in FIGS. 5 & 6.

Figure 4:
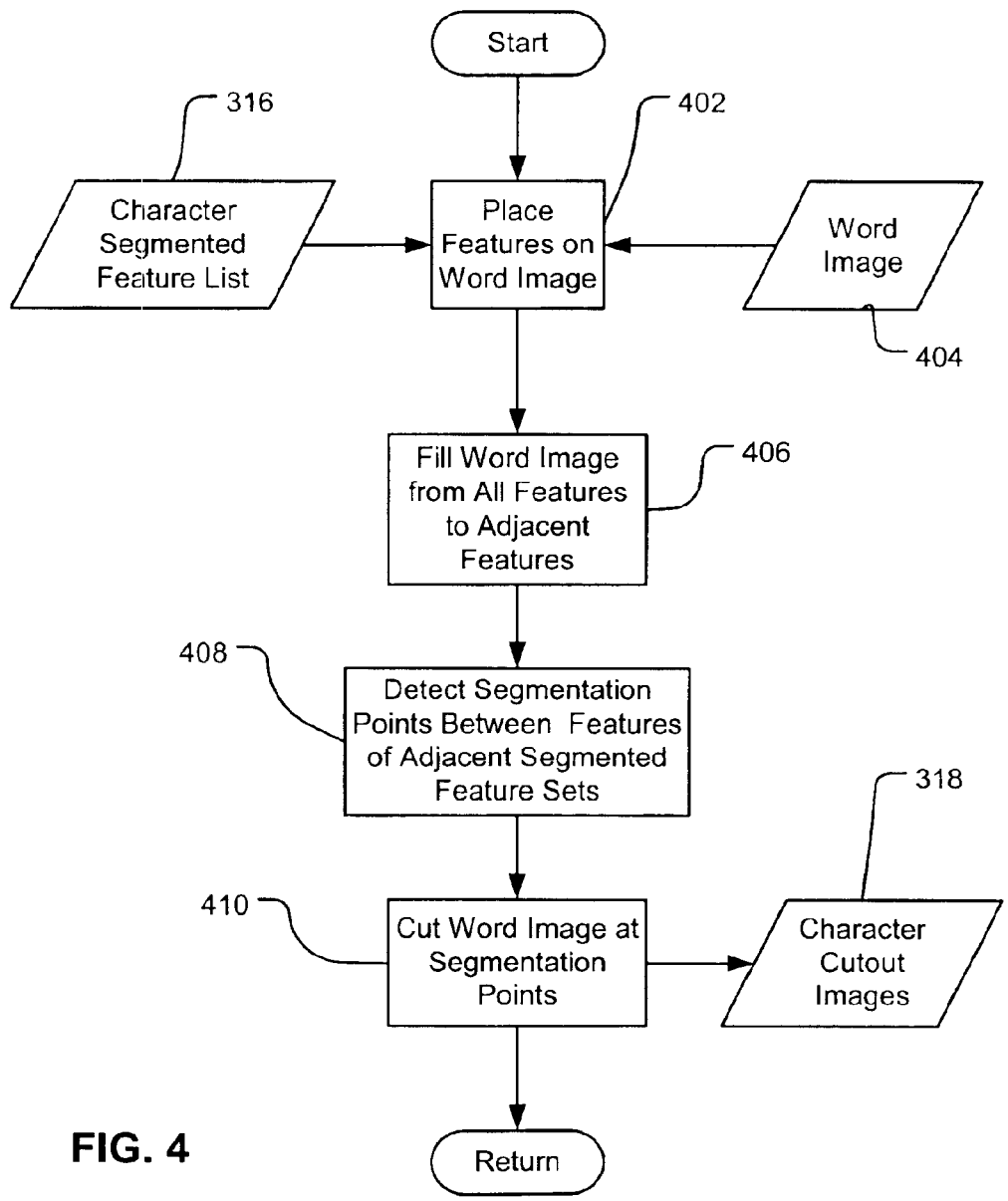
FIG. 4 shows the operational flow for the translate operation 306 in FIG. 3.

FIG. 4 illustrates in more detail the operations of translate module 306. The translate module operations begin at place operation 402 which locates character features on the digitized word image. Place operation 402 receives the digitized word image 404 and the character segmented feature list 316. The digitized word image may be viewed as an electronic image of the original input word, digitized as a grid of binary picture elements (pels). The character segmented feature list 316 contains the character segmented features of a holistic word answer as described above in FIG. 3 and also contains the location of each character feature in the word image. This location is determined by the identify feature operation 304 in FIG. 3, and it is included in the features list 312, also in FIG. 3. Accordingly, place operation 402 locates on the digitized word image all the character features in the word image. In other words, if the character features are metastrokes, the location of each metastroke along the word image is determined by place operation 402. Each of the metastrokes in the string of metastrokes identified for the word image are placed at the proper location along the digitized word image.

After the metastrokes are properly placed on the word image, fill operation 406 begins to simultaneously fill all of the pels along the digitized word image between all of the character features. In effect, the pels inside the character image between the metastrokes are filled starting from the edge of each metastroke feature and moving outward from the feature. At some point, as the digitized word image is filled from each metastroke feature, the fill will meet between the two features. In effect, it is as if one were painting the digitized image to fill the blank space along the digitized image between metastroke features. When this painting is done at a constant rate of speed from all features at the same time, then the filling or painting will meet halfway between the metastroke features.

Fill detect operation 408 detects segmentation points between characters by detecting the point at which filling between metastroke features meets for those adjacent features from adjacent segmented feature sets. In other words, if two adjacent metastrokes are located in different character metastroke sets, then the meeting point for filling the digitized image between those adjacent metastrokes will be detected as a segmentation point between the characters represented by the metastroke sets. After each of these segmentation points is determined between the character feature sets, segment operation 410 cuts the word image at each of the segmentation points. Cutting the word image at the segmentation points provides the character cutout images 318 used in analytic recognition phase for the word. This completes the operations of the translate module 306 in FIG. 3.

Figure 5:
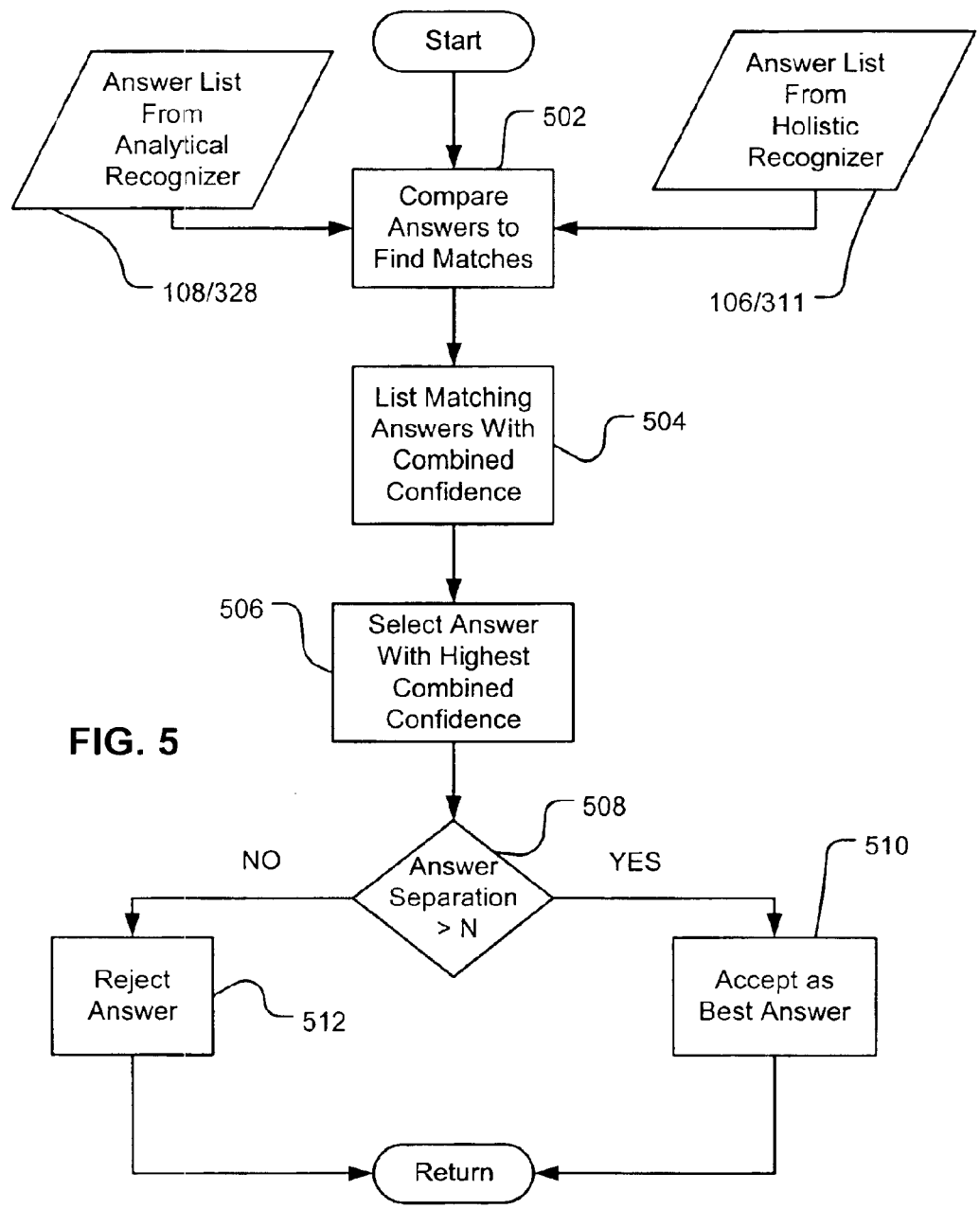
FIG. 5 shows the operational flow for the merge or best answer phase in FIGS. 1 and 3.

FIG. 5 illustrates one embodiment for the find operation 110 or the merge or best answer phase in FIG. 3. In FIG. 5, the best answer operations begin at operation 502 which compares answers from the analytic answer list and the holistic answer list to find matches. When the same answer is on both lists, list operation 504 lists the matching answers with a combined value for their confidence. The combined value might simply be the average of the two confidence values. Alternatively the confidence in answers on each list might be weighted and combined. Where an answer is only on one list, it is possible to still add that answer on the matching answer list, by averaging the confidence value associated with the answer with a second confidence value of zero or weighting the confidence value to reflect the fact that it was only on one list. For extremely high confidence values for a single answer, this might still provide a significant answer on the answer list of matching answers.

Select operation 506 then selects the answer with the highest combined or average confidence as a best answer from the two answer lists, i.e. the analytic answer list and the holistic answer list. This best answer is tested by answer separation decision operation 508. Decision operation 508 is testing whether the difference in confidence values, i.e. an answer separation value, between the highest combined confidence answer and the next highest combined confidence answer is greater than a threshold value N. If the answer separation value is greater than N, the best answer is accepted by operation 510. If the answer separation is less than the threshold value N, then the operation flow branches NO to reject operation 512 which rejects the answer and flags an error. After either rejecting or accepting the best answer, the operation flow returns to the main program.

Figure 6:
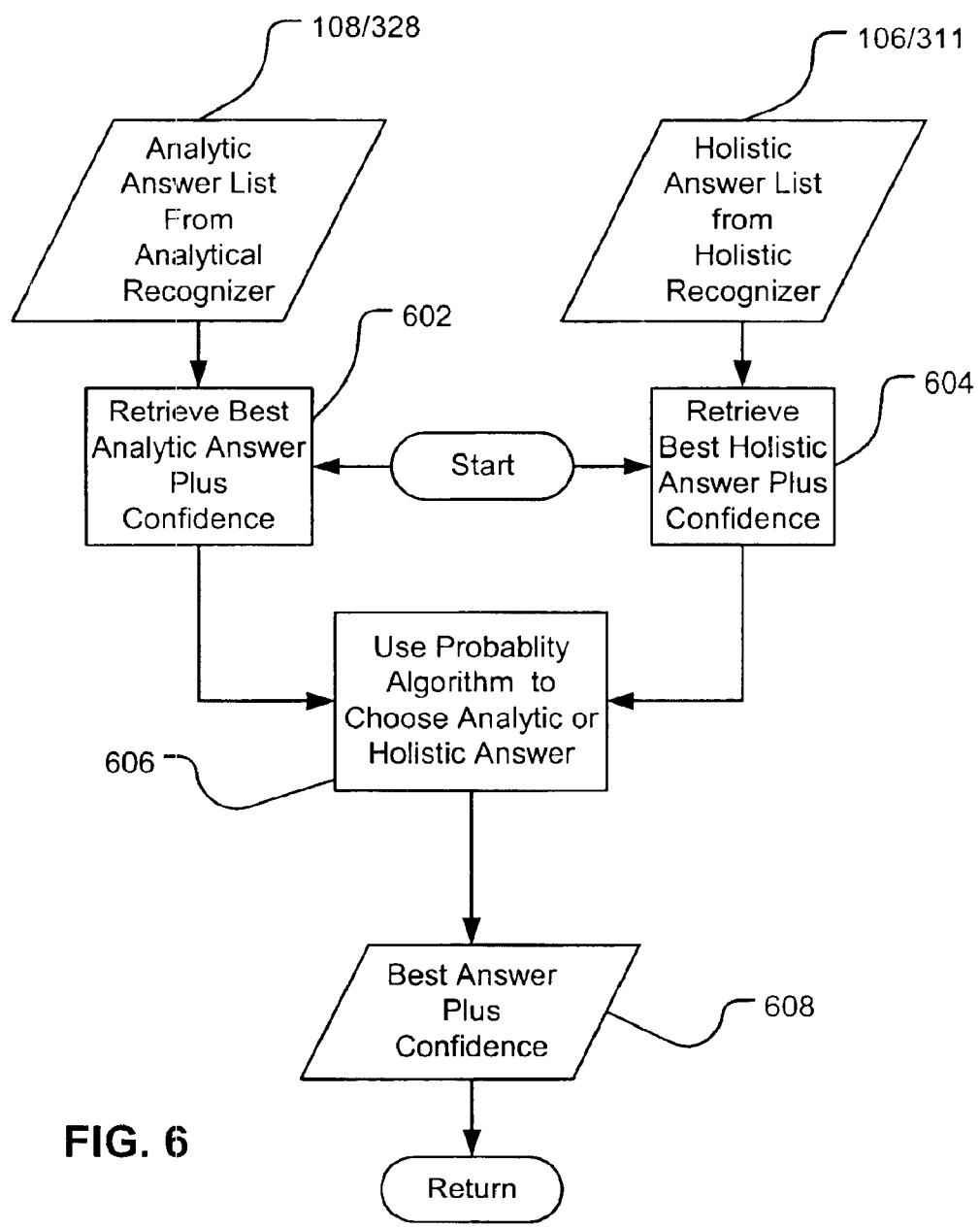
FIG. 6 shows the operational flow for another embodiment of the best answer phase in FIGS. 1 and 3.

FIG. 6 illustrates an alternative embodiment for finding the best answer. In FIG. 6 the operations begin at retrieve operation 602 and retrieve operation 604. Retrieve operation 602 retrieves the best analytic answer from the analytic answer list 108 (FIG. 1) or 328 (FIG. 3). The best answer on each list will be the answer with the highest confidence value. Retrieve operation 604 retrieves the best holistic answer from the holistic answer list 106 (FIG. 1) or 311 (FIG. 3). The best analytic answer and the best holistic answer are passed to select operation 606. Select operation 606 uses any well known probability algorithm to choose the analytic or holistic answer as the best answer 608. The best answer plus its confidence 608 is the result of the select operation 606.

Figure 7:
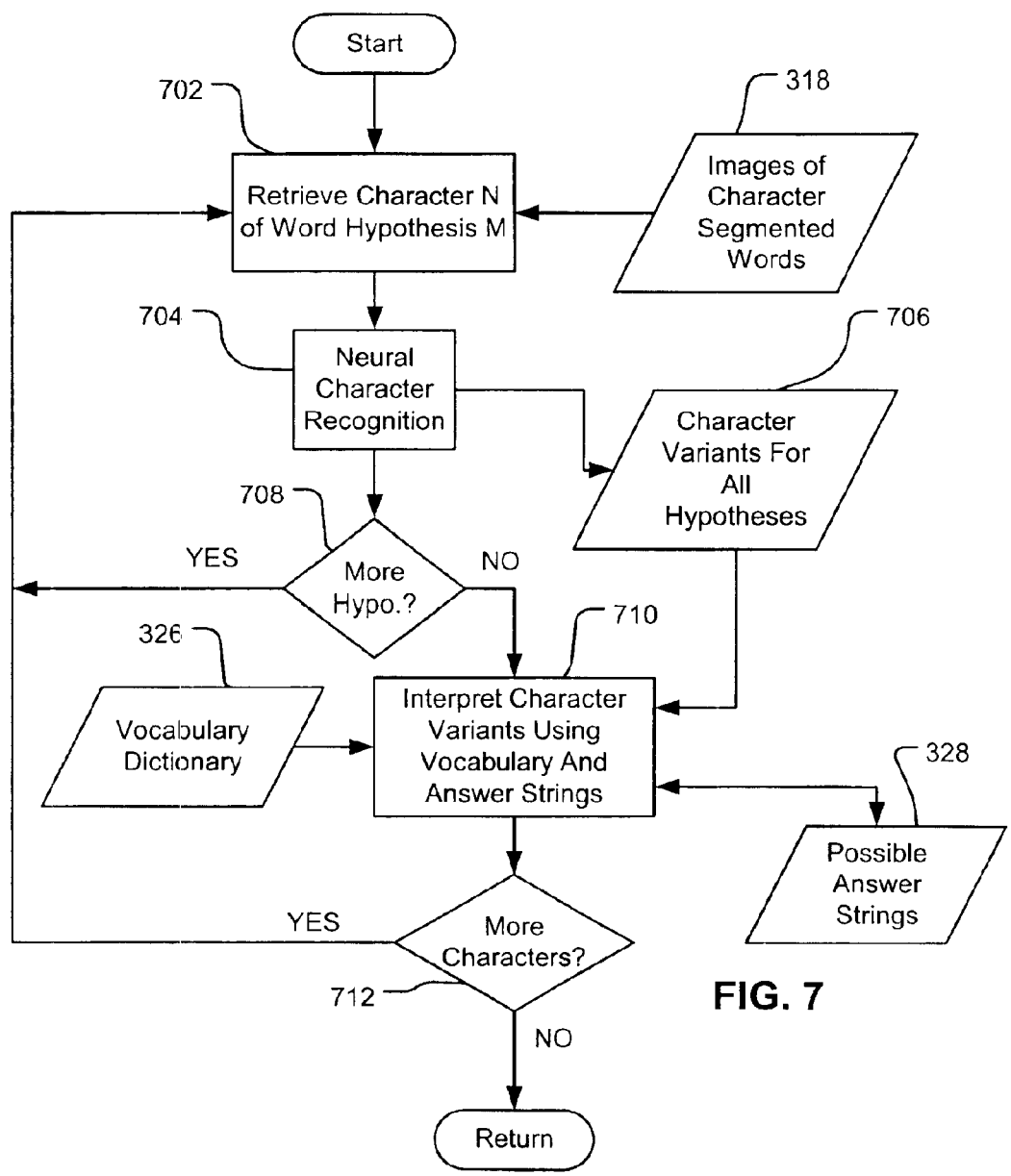
FIG. 7 shows the operational flow for the analytical recognition operation 320 in FIG. 3.

In FIG. 7 the operational flow for one embodiment of an analytical recognizer module 320 is illustrated. The flow begins at retrieve operation 702 which retrieves from the character cutout images 318 for the character segmented word (FIG. 3) the first character image in the first segmented word segmentation hypothesis of the word image. This character image is recognized by neural character recognition operation 704. All variants of the character and the confidence in the recognition of each variant is collected in character variants data file 706. Test operation 708 then detects if there is another segmentation hypothesis for the first character of the word. If there is another hypothesis, the operation flow branches YES back to retrieve operation 702 to retrieve the first character of the second hypothesis. The flow remains in this loop until all variants of all first characters for all hypotheses have been recognized and stored in the character variants file 706.

When all possible first characters have been recognized, the operation flow branches NO from test operation 708 to interpret operation 710. Interpret operation 710 uses the words in vocabulary dictionary 326 (same as Lexicon 326 in FIG. 3) to select from the character variants 706 the possible answers. Any character variant that does not have a word in the vocabulary with the same first character is discarded. Those that do have such a word are passed as the first character in possible answer strings 328. When all characters for all hypotheses have been processed, the possible answer strings will be the analytic answer word answers 328 (FIG. 3).

When all first characters have been interpreted query operation asks whether there are more characters in the string of characters in the character cutout images 318 for the segmented word. If there are more characters, the operation flow branches YES back to operation 702 to retrieve the second character for the first segmentation hypothesis. The iterative processes continue until all characters for all hypotheses have been recognized. The interpret operation 710 makes use of the possible answer strings along with the vocabulary to find possible word answers. For example if a particular answer string for the first two characters is "qu" and the third character variant is "v", and the dictionary has no words beginning with "quv" then the "v" variant for the third character will be rejected and not used. When all characters and all segmentation hypotheses have been processed, the possible answer strings collected in file 328 form the analytic ASCII word answer list. The confidence value for each answer is the sum of the confidence in the recognition of each character in the answer. Of course, other confidence algorithms could be used such as weighting the recognition confidences with values from the vocabulary.

Figure 8:
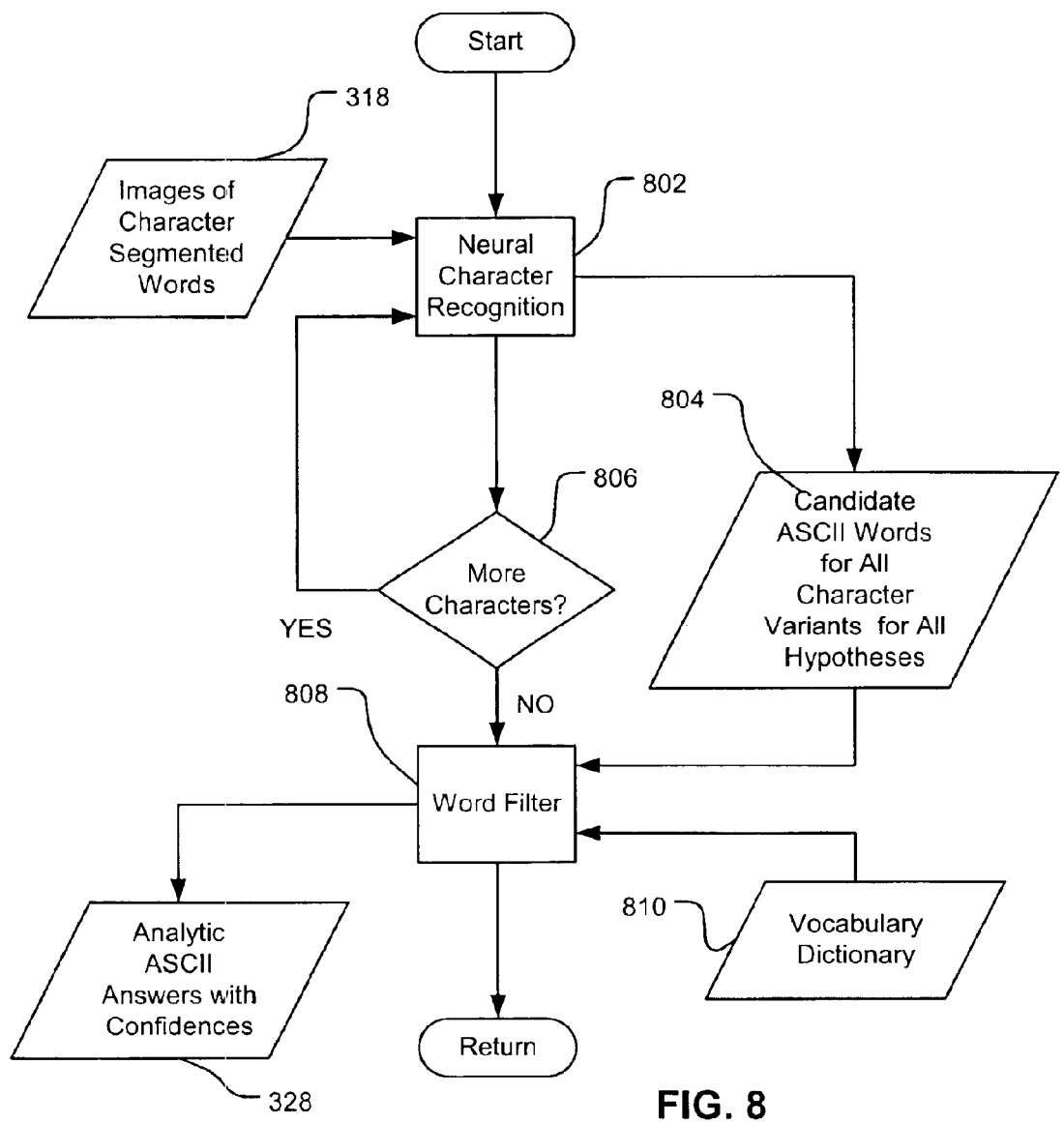
FIG. 8 shows the operational flow for another embodiment of the analytical recognition operation 320 in FIG. 3.

FIG. 8 illustrates an operational flow for another embodiment for the analytical recognition module 320 in FIG. 3. In FIG. 8, neural character recognition recognizes all possible character variants for all possible segmentation hypothesis based on the cutout images of character segmented words 318. In effect all possible ASCII words (legitimate or otherwise) are collected in candidate ASCII words list 804. When test operation 806 detects that all possible character variants for all possible segmentation hypotheses have been recognized, then word filter 808 operates to select legitimate word answers. Filter 808 uses the vocabulary dictionary 810 to pass to the analytic ASCII word answer list 328 only those candidate words from list 804 that have a counterpart word in the vocabulary dictionary 810. Again the confidence value is determined in the same manner as just discussed above for FIG. 7.

It will be appreciated by one skilled in the art that there are many other holistic recognition operations and analytical operations that could be substituted for those described above. All that is required to embody the invention is that the holistic recognition module must be able to provide character segmentation information for the input word image so that this segmentation information may be used to enhance the accuracy of the analytical recognition module. Results of both recognition operations may then be examined to select the best answer.

While the invention has been particularly shown and described with reference to preferred embodiments thereof, it will be understood by those skilled in the art that various other changes in the form and details may be made therein without departing form the spirit and scope of the invention.

What is claimed is:

1. Apparatus for recognizing a string of characters of hand written text in an image loaded in a computing system, the apparatus comprising:

holistic recognition means for recognizing the string of characters as a whole and generating a first answer list and a segmentation list, the first answer list containing a plurality of recognition answers for the string of characters in the image each answer having a confidence value that the answer is correct, the segmentation list containing segmentation information separating each character in the answers;

analytical recognition means responsive to the segmentation list for recognizing a plurality of characters individually and generating a second answer list for the string of characters in the image each answer having a confidence value that the answer is correct; and means responsive to the first answer list and the second answer list for finding the best recognition answer for the string of characters.

2. In a computing system for processing information loaded as cursive text, a method for recognizing the cursive text to provide digital information corresponding to the cursive text, the method comprising:

loading into the computing system an image of an input phrase of cursive text;

identifying features of the input phrase, each feature representing at least a portion of a character in the input phrase;

matching features of the input phrase against features of a plurality of reference phrases and generating a holistic answer list containing as answers reference phrases that are most similar to the input phrase along with a confidence value, the confidence value for each answer being a measure of similarity between features of the input phrase and the features of the reference phrase;

constructing a character segmented features list from the features of the input phrase and from the holistic answer list, the character segmented features list being a list of character feature sets segmented by characters in each answer from the holistic answer list;

translating the image of the input phrase into images of characters segmented according to answers in the holistic answer list based upon the character segmented features list;

analytically recognizing characters in the input phrase from the images of characters segmented according to answers in the holistic answer list and generating an analytical answer list containing analytical answers for the input phrase, each analytical answer having a confidence value as a measure of the similarity between characters in the analytical answer and characters in a reference phrase; and finding the best recognition answer from the answers on both the holistic answer list and the analytic answer list.

3. In a handwritten character recognition system a method for recognizing an input word of handwritten text in an image provided to the recognition system, the method comprising:

identifying from the input word image an input string of metastrokes where each metastroke represents a portion of an alphanumeric character in the text;

storing the input string of metastrokes as character feature images;

comparing as a whole the input string of metastrokes to a prototype string of metastrokes for reference words to generate a first recognition answer list having a plurality of possible answers;

creating a plurality of character segmentation hypothesis based on character segmented metastrokes for answers in the first recognition answer list;

translating each character segmentation hypothesis into character cutout images of the input word;

recognizing characters from the character cutout images and generating a plurality of character variants for each character position in the input word based on each segmentation hypothesis;

interpreting the plurality of character variants of the input word for each segmentation hypothesis based on a vocabulary and generating a second recognition answer list having a plurality of possible answers; and finding a best answer from the first and second answer lists as the recognition of the input word.

4. The apparatus of claim 1, wherein the string of characters is a series of alphanumeric characters and spaces that make up a word, a sequence of words, one or more numbers, or a mix of words, alphabetic characters and numbers.

5. The apparatus of claim 1, wherein means for finding comprises:

means for matching one or more recognition answers of the first answer list to one or more recognition answers of the second answer list to generate one or more matching answer pairs, each matching answer pair having an associated combined confidence value; and means for evaluating the combined confidence value associated with each matching answer pair to designate a matching answer pair having a highest combined confidence value as the best recognition answer.

6. The apparatus of claim 5, wherein the combined confidence value associated with each matching answer pair is defined by an average of the confidence values of the recognition answer of the first answer list and the recognition answer of the second answer list of the matching answer pair.

7. The apparatus of claim 5, wherein the means for finding comprises:

means for testing the highest combined confidence value against a next to highest combined confidence value to define an answer separation value; and means for rejecting the matching word pair associated with the highest combined confidence value as the best recognition answer if the answer separation value is less than a predetermined threshold value.

8. The apparatus of claim 1, wherein the means for finding comprises:

means for evaluating a highest confidence value of the first answer list and a highest confidence value of the second answer list against a probability algorithm to identify the best recognition answer for the string of characters.

9. The method of claim 2, wherein the input phrase and each reference phrase is a series of alphanumeric characters and spaces that make up a word, a sequence of words, one or more numbers, or a mix of words, alphabetic characters and numbers.

10. The method of claim 3 further comprising:

identifying each of the plurality of possible answers of the first recognition answer list with a metastroke confidence value corresponding to a degree of similarity between the metastrokes representing the input word and the prototype string of metastrokes associated with each possible answer in the first recognition answer list; and identifying each of the plurality of possible answers of the second recognition answer list with a confidence value based on a character recognition confidence value of each character variant in each possible answer in the second recognition answer list, the character recognition confidence value corresponding to a degree of similarity between the character variant and the matched character cutout image.

11. The method of claim 10, wherein the operation of identifying each of the plurality of possible answers of the second recognition list comprises:

combining the character recognition confidence value of each character variant in each of the plurality of possible answers of the second recognition answer list to generate a resultant confidence value for each of the plurality of possible answers.

12. The method of claim 11, wherein the finding operation comprises:

matching one or more possible answers of the first recognition list to one or more possible answers of the second recognition list to produce one or more matching answer pairs;

combining the metastroke confidence value associated with the possible answer of the first recognition answer list and the resultant confidence value associated with the possible answer of the second recognition answer list in each matching pair to define a combined confidence value for each pair; and designating the matching answer pair having a highest combined confidence value as the recognition of the input word.

13. The method of claim 12, wherein the finding operation further comprises:

testing the highest combined confidence value against a next to highest combined confidence value to define an answer separation value; and rejecting the matching word pair associated with the highest combined confidence value as the recognition of the input word if the answer separation value is less than a predetermined threshold value.

* * * * *